(12) United States Patent
Matsudaira

(10) Patent No.: US 11,423,122 B2
(45) Date of Patent: Aug. 23, 2022

(54) SOFTWARE LICENSE MANAGEMENT SYSTEM AND MANAGEMENT METHOD

(71) Applicant: SHIMADZU CORPORATION, Kyoto (JP)

(72) Inventor: Atsushi Matsudaira, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 326 days.

(21) Appl. No.: 16/309,235

(22) PCT Filed: Jun. 15, 2016

(86) PCT No.: PCT/JP2016/067778
§ 371 (c)(1),
(2) Date: Dec. 12, 2018

(87) PCT Pub. No.: WO2017/216901
PCT Pub. Date: Dec. 21, 2017

(65) Prior Publication Data
US 2019/0163881 A1 May 30, 2019

(51) Int. Cl.
*G06F 21/10* (2013.01)
*G06F 16/958* (2019.01)
*H04L 51/08* (2022.01)

(52) U.S. Cl.
CPC .......... *G06F 21/105* (2013.01); *G06F 16/972* (2019.01); *G06F 21/10* (2013.01); *H04L 51/08* (2013.01)

(58) Field of Classification Search
None
See application file for complete search history.

(56) References Cited

U.S. PATENT DOCUMENTS

| | | | | |
|---|---|---|---|---|
| 6,003,070 A | * | 12/1999 | Frantz | H04L 51/066 709/206 |
| 6,502,127 B1 | * | 12/2002 | Edwards | H04M 1/2473 709/206 |

(Continued)

FOREIGN PATENT DOCUMENTS

| | | |
|---|---|---|
| JP | 2001-344034 A | 12/2001 |
| JP | 2003-58657 A | 2/2003 |

(Continued)

OTHER PUBLICATIONS

McRoberts et al. (Software Licensing in the Cloud Age) (Year: 2013).*

(Continued)

*Primary Examiner* — Mamon Obeid
(74) *Attorney, Agent, or Firm* — Sughrue Mion, PLLC

(57) ABSTRACT

An installation operator of a newly purchased analyzing device (10) performs software activation of the analyzing device PC (1) from an installation operator terminal (3) using his or her own account. At that time, the installation operator is registered in the server (5) as the license holder of the software. After that, when the installation operator issues a transfer request with an e-mail address of a device user who is a license transfer destination from a terminal (3) to a server (5) attached, a predetermined web page is created in the server (5) and an e-mail containing a URL is sent to the device user who has already acquired their account. When the device user issues an instruction of acceptance upon browsing the web page at the user terminal (2), the license holder of the software is transferred from the installation operator to the device user in the server (5).

10 Claims, 3 Drawing Sheets

(56) References Cited

U.S. PATENT DOCUMENTS

| | | | | |
|---|---|---|---|---|
| 6,738,065 B1* | 5/2004 | Even-Zohar | G06Q 30/06 | 345/473 |
| 6,944,776 B1* | 9/2005 | Lockhart | G06F 21/10 | 705/59 |
| 7,565,294 B2* | 7/2009 | Rhoads | G06Q 20/1235 | 704/270 |
| 8,103,591 B2* | 1/2012 | Bouchet | G06F 21/73 | 705/59 |
| 9,396,349 B1* | 7/2016 | Berfeld | G06F 21/6209 | |
| 9,954,866 B2* | 4/2018 | Roth | G06Q 10/10 | 705/59 |
| 10,013,536 B2* | 7/2018 | Dean | G06F 21/10 | 726/26 |
| 2002/0173976 A1* | 11/2002 | Martin | G06F 21/105 | 726/28 |
| 2002/0194010 A1* | 12/2002 | Bergler | G06Q 10/10 | 705/310 |
| 2003/0163808 A1* | 8/2003 | Cordova | G06F 21/10 | 717/176 |
| 2005/0114266 A1* | 5/2005 | Satkunanathan | G06Q 30/06 | 705/59 |
| 2005/0160064 A1* | 7/2005 | Lehtonen | G06F 21/10 | |
| 2006/0053080 A1* | 3/2006 | Edmonson | G06Q 30/06 | 705/59 |
| 2007/0050301 A1* | 3/2007 | Johnson | G06Q 30/06 | 705/59 |
| 2007/0094713 A1* | 4/2007 | Venn | G06Q 30/06 | 726/4 |
| 2007/0107067 A1* | 5/2007 | Fountian | G06F 21/10 | 726/33 |
| 2007/0219917 A1* | 9/2007 | Liu | G06Q 10/10 | 705/59 |
| 2008/0276321 A1* | 11/2008 | Svancarek | G06F 21/10 | 726/26 |
| 2008/0313086 A1* | 12/2008 | Milgramm | G06F 21/32 | 705/55 |
| 2009/0020600 A1* | 1/2009 | Akiba | G06F 21/629 | 235/375 |
| 2009/0031432 A1* | 1/2009 | Wakai | G06F 21/10 | 726/33 |
| 2009/0037336 A1* | 2/2009 | Sunata | G06F 21/105 | 705/59 |
| 2009/0092253 A1* | 4/2009 | Asipov | H04L 9/083 | 380/278 |
| 2009/0274304 A1* | 11/2009 | Kobayashi | G06F 21/10 | 380/277 |
| 2010/0037051 A1* | 2/2010 | Chang | H04L 63/0428 | 713/167 |
| 2010/0207869 A1* | 8/2010 | Cazaux | G06F 3/04892 | 345/156 |
| 2012/0151504 A1* | 6/2012 | Schwalbe | H04L 12/40 | 719/321 |
| 2012/0290975 A1* | 11/2012 | Khanke | G06F 21/105 | 715/810 |
| 2013/0041933 A1* | 2/2013 | Lynn | G06Q 30/00 | 709/203 |
| 2013/0218608 A1* | 8/2013 | Huson | G06Q 30/0603 | 705/5 |
| 2014/0014721 A1* | 1/2014 | Shima | G06Q 50/30 | 235/382.5 |
| 2014/0149516 A1* | 5/2014 | Paulraj | H04L 51/08 | 709/206 |
| 2016/0021118 A1* | 1/2016 | Roth | G06F 21/335 | 726/4 |
| 2016/0065679 A1* | 3/2016 | Robertson | G06F 21/10 | |
| 2016/0188903 A1* | 6/2016 | Webb | G06F 3/04892 | 345/156 |
| 2017/0078293 A1* | 3/2017 | Han | G06F 21/105 | 726/28 |
| 2017/0099246 A1* | 4/2017 | Ali | G06F 21/73 | 705/59 |
| 2018/0219818 A1* | 8/2018 | Kramer | G06F 21/10 | 726/33 |
| 2019/0163881 A1* | 5/2019 | Matsudaira | G06Q 30/06 | 705/59 |
| 2019/0213602 A1* | 7/2019 | Hue | G06Q 30/06 | 705/59 |
| 2020/0099667 A1* | 3/2020 | Parthasarathy | G06F 21/629 | 235/375 |

FOREIGN PATENT DOCUMENTS

| | | |
|---|---|---|
| JP | 2004-192099 A | 7/2004 |
| JP | 2008-21021 A | 1/2008 |
| JP | 2009-271680 A | 11/2009 |
| JP | 2014-32649 A | 2/2014 |

OTHER PUBLICATIONS

Communication dated Oct. 29, 2019, from the Japanese Patent Office in Application No. 2018-523101.

Written Opinion dated Aug. 30, 2016 in application No. PCT/JP2016/067778.

"LabSolutions analysis data system ER/ES related regulatory compliance", [online], Shimadzu Corporation, [Search on Jun. 8, 2016], 4 pages; Internet.

International Search Report for PCT/JP2016/067778 dated Aug. 30, 2016 (PCT/ISA/210).

Written Opinion dated Sep. 20, 2016 in application No. PCT/JP2016/067777.

* cited by examiner

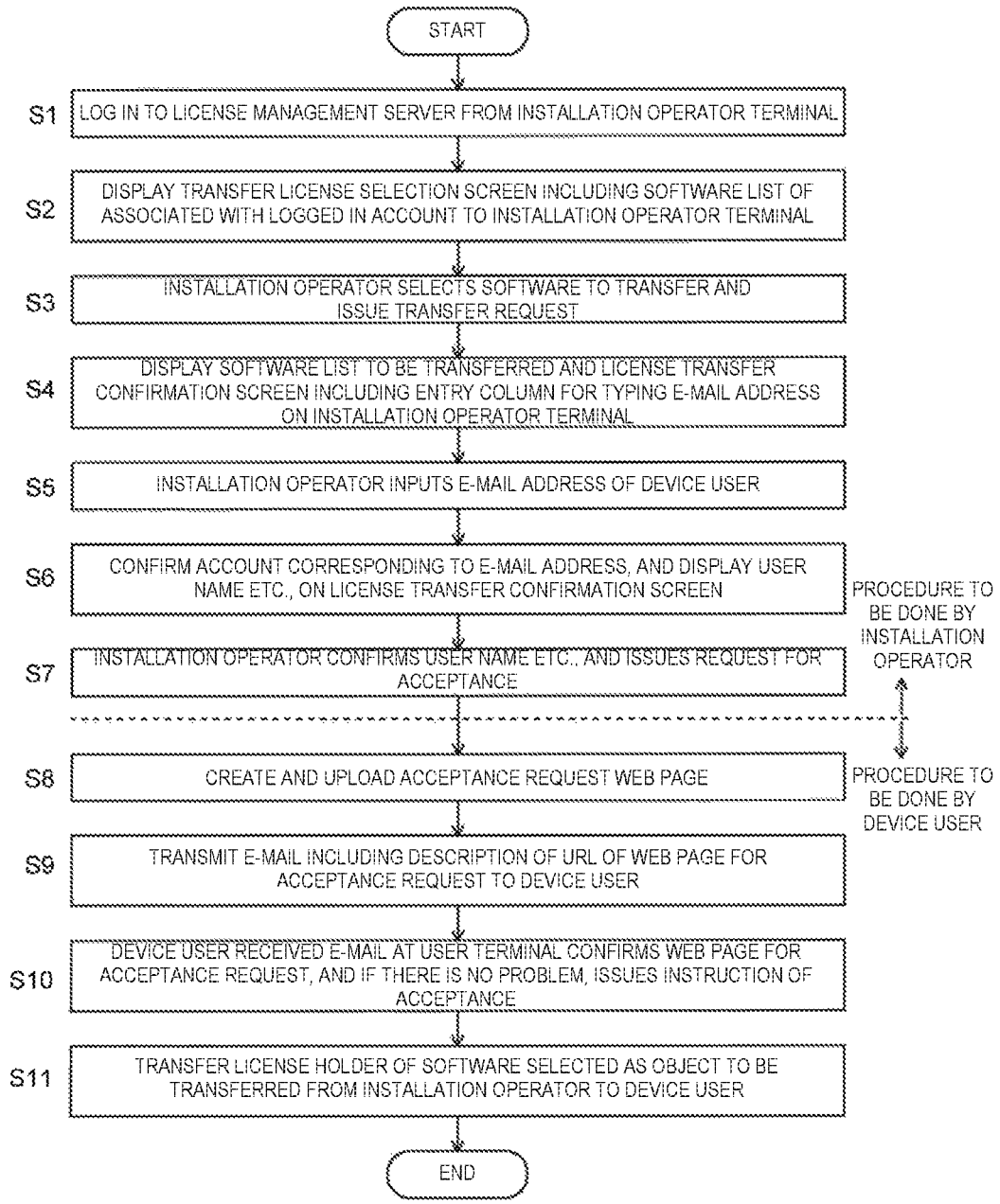

Fig. 3A

| ☐ | SERIAL NUMBER | ○○○ | ○○○ | ○○○ |
|---|---|---|---|---|
| ☑ | xxxxxx1 | | | |
| ☑ | xxxxxx2 | | | |
| ☑ | xxxxxx3 | | | |

[TRANSFER]

Fig. 3B

E-MAIL ADDRESS: [____]
USER NAME: [____]

| SERIAL NUMBER | SOFTWARE PRODUCT NAME | ○○○ |
|---|---|---|
| xxxxxx1 | XXXXX-1 | |
| xxxxxx2 | XXXXX-2 | |
| xxxxxx3 | XXXXX-3 | |

[ACCEPTANCE REQUEST]

Fig. 3C

ACCESS TO URL BELOW TO ACCEPT OR REJECT LICENSE https://activate.an.shimadzu.co.jp/···

Fig. 3D

| SERIAL NUMBER | SOFTWARE PRODUCT NAME | ○○○ |
|---|---|---|
| xxxxxx1 | XXXXX-1 | |
| xxxxxx2 | XXXXX-2 | |
| xxxxxx3 | XXXXX-3 | |

[ACCEPT]   [REJECT]

SOFTWARE LICENSE MANAGEMENT SYSTEM AND MANAGEMENT METHOD

CROSS REFERENCE TO RELATED APPLICATIONS

This application is a National Stage of International Application No. PCT/JP2016/067778 filed Jun. 15, 2016.

TECHNICAL FIELD

The present invention relates to a system and a method for managing software licenses installed in a computer such as a personal computer, and more particularly to a software license management system and a management method suitable for managing software licenses installed in a computer for controlling various analyzing devices and processing data obtained by the analyzing device.

BACKGROUND ART

In recent years, a personal computer (hereinafter abbreviated as "PC") in which a software dedicated for control of analyzing devices such as a gas chromatograph, a liquid chromatograph, a mass spectrometer, or the like and processing and management of various data obtained by these devices is installed has been widely used. As a method of preventing unauthorized use of software installed in a PC used in such a field, a license authentication method based on hardware such as a USB dongle has been conventionally in the mainstream. In recent years, however, an electronic license authentication method that links a license of a software to a specific device (analyzing device, PC, etc.) and restricts the use of the software to that specific device by linking the license to that specific device is in the mainstream. Such a license authentication method is normally referred to as "activation" (see, for example, Patent Literature 1).

Normally, in activation of software in PC or the like, a license management system is established in many cases in which software licenses held by a user are managed by a server of the manufacturer or sales company of the software. When performing activation online in such a system, the user first creates a user account on a predetermined web page that can be browsed through the Internet from the PC on which the software to be activated is installed, and uses the user account to access to the license management server to activate, that is, performs a license authentication. When the license authentication is completed, the software installed in the PC becomes usable.

Such a software installed in a PC that controls analyzing devices as described above and processes data acquired by the analyzing devices becomes usable only after receiving the license authentication. Therefore, the installation work of a newly purchased analyzing device usually involves installing hardware including the analyzing device and a PC attached thereto, as well as activating a software for the analyzing device. Therefore, conventionally, during the installation work of the analyzing device, an installation operator such as the manufacturer of the analyzing device or the like has to temporarily use an account of a license holder, that is, a user who purchased the device (more specifically, the person in charge of managing the device, etc.) to carry out the activation.

However, in such a conventional procedure, the license holder's account becomes known to the installation operator. Therefore, irrespective of the installation operator's intention, there was a security problem such as leakage of account information of the license holder.

CITATION LIST

Patent Literature

Patent Literature 1: JP 2008-21021 A

Non Patent Literature

Non Patent Literature 1: "LabSolutions analysis data system ER/ES related regulatory compliance", [online], Shimadzu Corporation, [Search on Jun. 8, 2016], Internet

SUMMARY OF INVENTION

Technical Problem

The present invention has been made to solve the above problems, and an object of the present invention is to provide a highly secured software license management system and a management method that can complete an activation without using an account of a user who is the license holder, even when a person, such as an installation operator, unrelated to the user is involved in the activation.

Solution to Problem

According to an aspect of the present invention, a software license management system includes:

a computer network;

one or more computers connected to the computer network, each provided with a receiving unit for receiving an e-mail and a browser for blowing a web page; and a license management server connected to the computer network, the system being configured to manage a license of a predetermined software installed on at least one of the one or more computers or another computer not connected to the computer network, and the license management server further includes:

a) a license information storage unit configured to register information capable of identifying the predetermined software and information capable of identifying a license holder in one-to-one correspondence;

b) a web page creation unit configured to create a license acceptance processing web page for the predetermined software in response to a license transfer request via the computer network from a license holder of the predetermined software on one of the one or more computers, c) an access information notification unit configured to send information accessible to the web page created by the web page creation unit via an e-mail to a computer of a license transfer destination user, the computer being one of the one or more computers, d) a license transfer processing unit configured to, upon performance of a license acceptance operation on the license acceptance processing web page browsed via the browser on the computer of the license transfer destination user who has received the e-mail, change the license holder of the predetermined software registered in a license information storage unit to the license transfer destination user.

According to another aspect of the present invention, a software license management method for managing a predetermined software license in a software license management system includes:

a computer network one or more computers connected the computer network, each provided with a receiving unit for receiving an e-mail and a browser for blowing a web page; and a license management server connected to the computer network, the method managing a predetermined software license installed on at least one of the one or more computers or another computer not connected to the computer network, and the license management server executes a series of processing including:

a) creating a license acceptance processing web page for the predetermined software in response to a license transfer request via the computer network from a license holder of the predetermined software on one of the one or more computers, b) sending information accessible to the created web page via an e-mail to a computer of a license transfer destination user, the computer being one of the one or more computers, c) upon performance of a license acceptance operation on the license acceptance processing web page browsed via the browser on the computer of the license transfer destination user who has received the e-mail, changing the license holder associated with identification information of the predetermined software in a license information storage unit storing information capable of identifying the predetermined software and license holders in one-to-one correspondence for managing licenses to the license transfer destination user.

In the software license management system and in the software license management method according to the present invention, the license management server may be constituted by one computer, or the functions may be distributed in a plurality of computers. The computer network is typically the Internet, but it may be a normal closed computer network such as an intranet. The one or more computers connected to the computer network are typically personal computers, but they may be information terminal devices on which a mailer and a browser are mounted, such as so-called tablet type terminals and smartphones.

In the software license management system according to the present invention, the information capable of identifying the predetermined software, for example, a product serial number of the software, and the information capable of identifying a license holder, for example, account information, are registered in the license information storage unit in one-to-one correspondence. When a license holder of the predetermined software wishes to transfer the license to another person (user), the license holder submits a license transfer request from one of the one or more computers connected to the computer network to the license management server. The license transfer request may include the information of the license transfer destination user, more specifically, the e-mail address of the user.

Upon receiving the license transfer request, a web page creation unit creates a web page for license acceptance processing for the predetermined software. In addition, an access information notification unit sends the information accessible to the created web page, typically an address (URL) of a storage location of the web page, to a computer of the license transfer destination user by an e-mail. The user who has received the e-mail browses the web page for license acceptance processing based on access information described in the received e-mail, and performs a predetermined operation if the user desires the license acceptance on the web page. Upon receiving an operation corresponding to the acceptance, on the license management server side, the license transfer processing unit changes the license holder of the predetermined software registered in the license information storage unit to the license transfer destination user. If the license management server receives an operation to reject the license acceptance or when a term of validity of the sent e-mail expires, the license holder is not changed but maintained.

It is preferable in the software license management system according to the present invention that, the license management server further includes an account management unit configured to create and manage a user account for using the server in response to a request from any one of the one or more computers, and the software license management system is configured so that, when the license holder of the predetermined software submits the license transfer request, the license holder logs in using his or her own user account managed by the account management unit, and when the license transfer destination user browses the license acceptance processing web page, the license transfer destination user logs in using his or her own user account managed by the account management unit.

For example, in a case where the installation operator performs the installation work of the analyzing device as described above, the activation of the software installed in the PC connected to the analyzing device is performed by the installation operator instead of the user who purchased the device (hereinafter referred to as "device user"). At this time, if the installation operator uses his/her own user account instead of the user account of the device user, the installation operator is registered as the license holder for the software. Therefore, in the software license management system according to the present invention, after the installation operator finishes the activation, the installation operator issues a license transfer request from his/her PC, smartphone or the like as the license holder of the software, and transfers the license holder to the device user who is the original license holder. At that time, the device user can log in to the license management server with his/her own user account (a user account different from the user account of the installation operator) to perform a license acceptance operation. In other words, since the installation operator does not need to use the user account of the device user when performing the activation, the account information of the device user is not known to the installation operator. Therefore, high security can be achieved.

For example, as disclosed in Non Patent Literature 1, software for an analyzing device may have a system configuration such that, for example, a plurality of softwares corresponding to various kinds of analyzing devices and a plurality of softwares for controlling a plurality of units constituting one analyzing device are collectively stored in one package, but the user needs to apply license authentication for each of the plurality of softwares. That is, the user needs to receive licenses as many as the number of software that the user wants to use, or as many as the number of software corresponding to the units used for analysis. In such a case, it is sometimes desired to transfer all the licenses of all the softwares included in one software package at once, and it is desired in other cases to transfer only licenses of some of the softwares.

Therefore, in the software license management system and management method according to the present invention, the system may be configured that the predetermined software is composed of a plurality of segment softwares which perform different functions, and the license transfer request is capable of requesting license transfer by individually specifying the plurality of segment softwares constituting the predetermined software.

According to the configuration described above, a plurality of licenses of softwares (the above-described segment softwares) included in one software package can easily be transferred to the user all at once or partially by the license holder's choice. In particular, when transfer of a large number of licenses of softwares included in one software package is desired, if an operation for transferring the license has to be performed one by one, it requires much labor and time. On the other hand, with this configuration, by selecting a plurality of licenses to be transferred all at once and requesting the transfer, the owner is changed at a time for the selected plurality of licenses, so that labor and time for license transfer can be saved. Thus, the software license management system and management method according to the present invention is suitable for analysis systems having a system configuration including software corresponding to various analyzing devices and software having different functions are packaged in one package as described above and configured to acquire licenses for each function that the user desires to use.

In the software license management system and management method according to the present invention, a computer on which software to be subjected to license transfer is installed may be connected to a computer network, but the computer does not necessarily have to be connected to a computer network. In other words, even for software installed in a computer not connected to a computer network such as the Internet, that is, in an offline state, the license may be transferred by using the software license management system and management method according to the present invention.

In the analysis system including the above-described various analyzing devices described above, PCs for control and data processing are not connected to the Internet for security reasons in many cases. However, in such a case as well, according to the software license management system and management method according to the present invention, the software license installed in the computer in the system may be transferred to the device user adequately from the installation operator. In this point as well, the software license management system and management method according to the present invention may be suitable for license management of computers in analysis systems and the like.

Advantageous Effects of Invention

According to the software license management system and the management method of the present invention, when installing an analyzing device for which control or data processing is performed by a PC for example, the installation operator can perform the activation of the software installed in the PC by using his or her own user account, and then after the activation is completed and the software becomes usable, can transfer the software license to the device user who is an original license holder, so that the device user may perform usage or management of the software by using the user account of his or her own. Accordingly, since the account of the device user with high confidentiality is not known to the installation operator, high security can be secured.

BRIEF DESCRIPTION OF DRAWINGS

FIG. 2 is a flowchart showing a characteristic license transfer process and a working procedure in the software license management system of the present example.

FIGS. 3A-3D are diagrams showing an example of a display screen on a terminal for explaining the license transfer process shown in FIG. 2.

DESCRIPTION OF EMBODIMENTS

Figure 1:
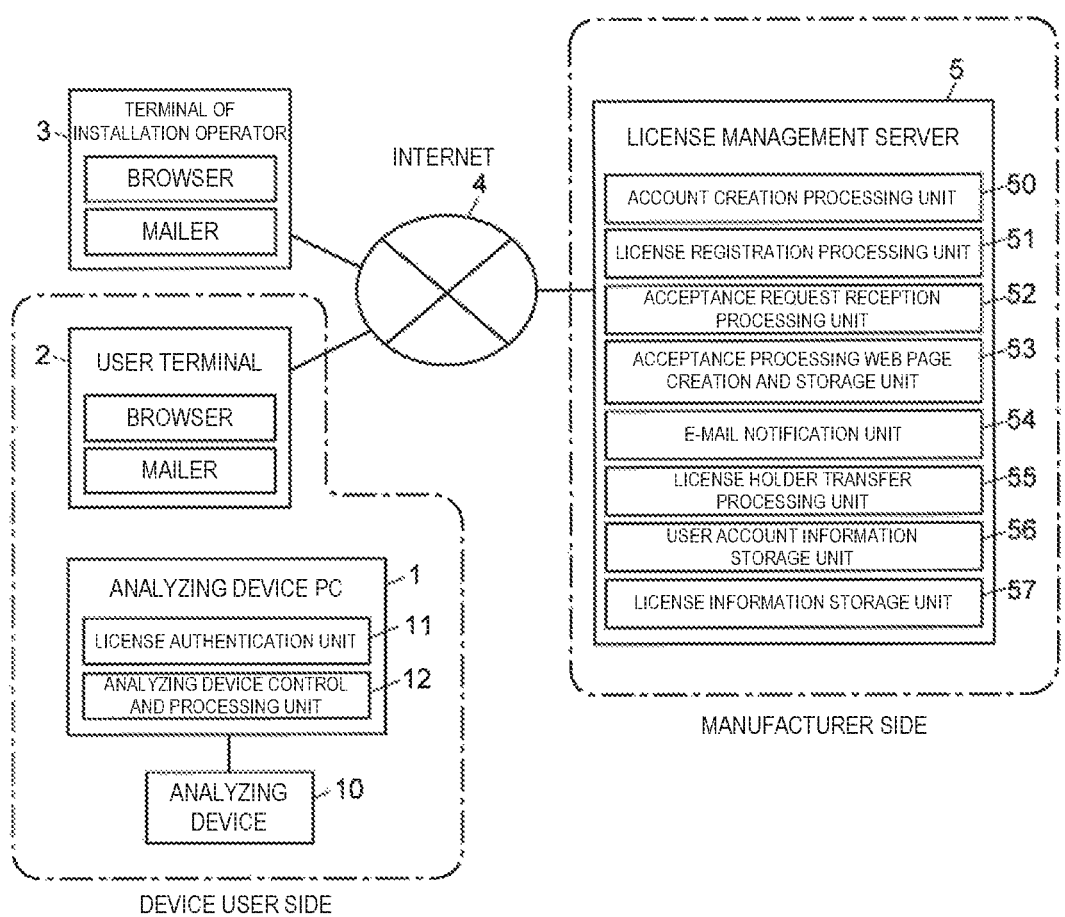
FIG. 1 is a schematic configuration diagram of an example of a software license management system according to the present invention.

An example of a software license management system according to the present invention will be described with reference to the accompanying drawings.

FIG. 1 is a schematic configuration diagram of a software license management system according to this example. The software license management system of this example is connected to an analyzing device such as a liquid chromatograph, a gas chromatograph, or the like, and is a system for controlling licenses of dedicated control and processing software installed in a PC for controlling the analyzing device or processing data obtained by the device.

The software license management system according to the present example includes an analyzing device PC 1 connected to an analyzing device 10 for executing a predetermined analysis on a sample and collecting measurement data, and a license management server 5 which is actually a computer and usually under control of a manufacturer of the analyzing device 10 (or a seller of dedicated software described later installed in the analyzing device PC 1), a PC held by a device user of the analyzing device and the PC 1 for the analyzing device which is held by the device user of the analyzing device 10 and the analyzing device PC 1 (or in an environment usable by the device user), a user terminal such as a user terminal 2 such as a PC, a tablet type terminal, a smartphone or the like, a PC which is in an environment usable by a device user, and installation work such as a PC, and an installation operator terminal 3 such as a tablet type terminal, a smartphone, etc. The user terminal 2, the installation operator terminal 3, and the license management server 5 are connected to the Internet 4 corresponding to the computer network in the present invention. On the other hand, the analyzing device PC 1 is not connected to the internet 4 in order to avoid intrusion from the outside via the Internet 4 to ensure high security.

The analyzing device PC 1 includes an installed dedicated control and processing software for controlling the analyzing device 10 and processing data obtained by the device 10, and includes a license authentication unit 11 in addition to an analyzing device control and processing unit 12 as functional blocks embodied by executing the software on the PC1. Each of the user terminal 2 and the installation operator terminal 3 includes a standard browser and a mailer that are installed in a PC or the like respectively. The license management server 5 includes, as functional blocks embodied by executing a preinstalled program on a computer, an account creation processing unit 50, a license registration processing unit 51, an acceptance request reception processing unit 52, an acceptance processing web page creation and storage unit 53, an e-mail notification unit 54, a license holder transfer processing unit 55, a user account information storage unit 56, and a license information storage unit 57.

Account information such as a user name, a user ID, a password, and an e-mail address is stored in the user account information storage unit 56 in order to identify a user who can use the license management server 5. In the license information storage unit 57, information for linking a serial number of the control and processing software installed in the analyzing device PC 1 and the license holder's account information is stored.

In the system of the present embodiment, the control and processing software installed in the analyzing device PC 1 is one package software, but is composed of a plurality of softwares having different functions such as for a gas chromatograph and for a liquid chromatograph, for example (however, some programs are used in common), and a license is set for each software. Therefore, the device user can selectively receive the license authentication only for one or a plurality of softwares scheduled to be used by the device user, rather than receiving license authentication for all the softwares included in the package software. For example, only a gas chromatograph is used as the analyzing device 10, and a device user not using a liquid chromatograph or the like can acquire a license only for software for gas chromatograph in one package software. Of course, depending on the device user, it is also conceivable to acquire licenses of all softwares included in the package software, including a software that has not been determined whether or not to be actually used.

In FIG. 1, one analyzing device 10 is connected to one analyzing device PC 1, but a plurality of analyzing devices may be connected to one analyzing device PC 1. In that case, the types of the plurality of analyzing devices need not to be the same, and may be different types of analyzing devices such as a liquid chromatograph, the gas chromatograph, a spectrophotometer, a mass spectrometer, for example.

Naturally, the license management server 5 intensively manages a large number of licenses of control and processing software.

Installation of the newly purchased analyzing device 10 and analyzing device PC 1 is performed by the installation operator. The installation operator not only installs the hardware at the designated position of the designated location but also performs an activation for the control and processing software installed in the analyzing device PC 1 together. Then, after confirming that the software is in a usable state, the analyzing device and the analyzing device PC 1 are delivered to the device user. In the software license management system of this example, at that time, the device user is made a license holder of the control and processing software installed in the analyzing device PC 1 according to characteristic processes and work procedures. The processing and the procedure of the work will be described in detail below.

As part of the installation work, the installation operator first performs activation of the control and processing software installed in the analyzing device PC 1 (or installed in the analyzing device PC 1) as follows.

For this purpose, the installation operator creates a user account in advance. More specifically, the installation operator activates the browser on the installation operator terminal 3 and accesses a predetermined address (URL). The license management server 5 receives the access via the Internet 4, and the account creation processing unit 50 displays a login screen on which an account can be created on the display unit of the installation operator terminal 3. The installation operator inputs the number of a license certificate previously provided together with the account information such as the user name, the password, the e-mail address, and the like, and requests account registration. Upon receiving this request, the account creation processing unit 50 creates a user account of the installation operator and stores the account information in the user account information storage unit 56.

One the user account is registered, log in to the license management server 5 is achieved by entering the user ID and the password on the login screen thereafter. Since the creation of the user account can be made at any time as long as the number of the license certificate is known, the installation operator usually acquires his or her own user count in advance.

Next, the installation operator performs the activation of the control and processing software using his or her own user account.

More specifically, when the installation operator performs a predetermined operation on the analyzing device PC 1, the license authentication unit 11 displays a machine code registered in advance on the screen of the display unit. The machine code is a code assigned in advance to identify the PC to be connected to the analyzing device. Although the program that embodies the license authentication unit 11 is part of the control and processing software, the program itself functions regardless of whether or not the software is activated.

The installation operator logs in to the license management server 5 from the installation operator terminal 3 using his or her own user account and performs a predetermined operation. Upon this operation, the license registration processing unit 51 of the license management server 5 displays an activation input screen on the display unit of the installation operator terminal 3. The installation operator inputs a product serial number, security code, etc., of the control and processing software in addition to the above machine code on the activation input screen. Upon reception, the license registration processing unit 51 confirms whether or not the correspondence between the machine code and the product serial number is correct, and then issues an activation code, and sends the installation operator by displaying it on the screen of the display unit of the installation operator terminal 3. Actual activation is enabled only after acquisition of the activation code. In other words, the installation operator inputs the activation code on the screen displayed on the analyzing device PC 1 by the license authentication unit 11, and instructs an execution of the activation. Upon reception of instruction, the license authentication unit 11 confirms the activation code, and if it is an authorized activation code, activates the control and processing software.

On the other hand, the license registration processing unit 51 in the license management server 5 issues an activation code, and registers information linking the product serial number of the control and processing software installed in the analyzing device PC 1 with the user account of the installation operator in the license information storage unit 57. The control and processing software becomes usable upon completion of the activation by the installation operator. However, in terms of license management, the license holder of the control and processing software at this time point is the installation operator.

Upon completion of all the installation work including the above-mentioned activation, the installation operator performs the license transfer work described below for transferring the license for the control and processing software, which he or she holds at that time, to the device user. FIG. 2 is a flowchart showing the procedure of this process and work. FIGS. 3A-3D show an example of a display screen in the process of this operation.

The installation operator logs in to the license management server 5 from the installation operator terminal 3 by using his or her own user account and performs a predetermined operation (Step S1). Upon reception of this operation, the acceptance request reception processing unit 52 of the license management server 5 acquires the software license corresponding to the logged-in user account, that is, in this case, the above-mentioned control and processing software license information held by the installation operator at that time from the license information storage unit 57, creates a transfer license selection screen 100 as shown in FIG. 3A based on the acquired license information, and displays the same on the display unit of the installation operator terminal 3 (Step S2).

As shown in FIG. 3A, on the transfer license selection screen 100, a software list 101 for which a person who logs in possesses a license at that time is included. In this example, in the list 101 in the transfer license selection screen 100, three software programs having different functions included in one package software are listed, and a license can be set for each of them. The plurality of licenses can be transferred individually, and a checkbox 102 is provided for selecting whether or not to transfer the license for each software. In the case where the installation operator transfers the license to the original device user, the transfer is achieved by selecting a software by putting a check mark in some or all software purchased by the device user included in the control and processing software and clicks "transfer" button 103 to request transfer (Step S3).

In response to this operation, the acceptance request reception processing unit 52 recognizes the software that the license is to be transferred and, as shown in FIG. 3B, receives an e-mail address entry column 111 of a user as a transfer destination (the device user in this case), and a transfer license confirmation screen 110 including a software list 113 that the license is to be transferred is displayed on the display unit of the installation operator terminal 3 (Step S4). The installation operator fills in the e-mail address of the device user in the e-mail address entry column 111 on the transfer license confirmation screen 110 (Step S5). Then, the acceptance request reception processing unit 52 collates the filled e-mail address with the user account information storage unit 56 and if the user account is registered, displays the corresponding user name and the like in the user information display field 112 on the transfer license confirmation screen 110 (Step S6). Since the license cannot be transferred unless the user account of the transfer destination device user is registered in the user account information storage unit 56, the device user needs to create his own user account in advance. The procedure is the same as the creation of the user account of the installation operator.

The installation operator confirms the user information and the software to be transferred on the displayed transfer license confirmation screen 110, and if no problem is found, issues an acceptance request instruction by clicking the "acceptance request" button 114 (Step S7). Up to this point is the work that the installation operator should perform with regard to license transfer, and after that the device user himself or herself needs to do the work.

In the license management server 5 receiving the acceptance request instruction, the acceptance processing web page creation and storage unit 53 creates a web page for acceptance processing in a predetermined format and uploads the web page to an internal or another web server (Step S8). Further, the e-mail notification unit 54 creates an e-mail in a predetermined format shown in FIG. 3C containing the address (URL) of a storage location of the uploaded web page for acceptance processing. Then, the e-mail is transmitted to the e-mail address of the device user entered in Step S5 (Step S9).

Since the e-mail is sent to the user terminal 2 of the device user, the device user receives the e-mail at the user terminal 2. Then, the device user clicks the URL of the web page described in the e-mail and browses an acceptance processing web page by the browser. As shown in FIG. 3D, the acceptance processing web page 130 includes a software list 131 to be transferred, and the device user confirms this and, if no problem is found, clicks the "accept" button 132 (Step S10). If any problem, such as the shortage of software to be transferred, is found, the operation of clicking the "Reject acceptance" button 133 is performed to retry the operation.

In the license management server 5 that has received the license acceptance operation, the license holder transfer processing unit 55 transfers the user account of the license holder linked to the software to the user account of the device user as the license transfer destination, and rewrites the information stored in the license information storage unit 57 (Step S11). As a result, the license holder of the control and processing software installed and activated in the analyzing device PC 1 is changed from the installation operator to the device user who is the original holder.

As described above, in the system of the present example, after the installation operator performs the activation by using his/her user account to make the software usable, the activated software license may be transferred to the device user who is the original license holder. At this time, the device user who is the license holder after the transition can freely set the user account, and thus even if the information of the user account of the installation operator leaks out, the third party cannot perform any work on the above-described software with the leaked user account. In this way, high security can be secured.

The above description relates to the transfer of the license from the installation operator to the device user at the time of installation of the device. Likewise, transfer of the license from one device user to another user is also possible.

In the example given above, the present invention is applied to the activation of control and processing software of the analyzing device. However, the present invention may also be applied to the activation of software installed in any computer such as a general PC, a workstation, and a server. For example, even in the case of a general PC, there are cases where all the various settings of the software of the newly purchased PC are requested to the person in charge of the dealer. Even in such a case, the present invention is extremely useful.

In addition, the above-described embodiments are merely examples of the present invention, and it is obvious that any corrections, additions, and modifications appropriately made within the scope of the gist of the present invention are included in the scope of claims of the present invention.

For example, in the above embodiment, the analyzing device PC 1 is not connected to the internet 4, but it may be connected to the internet 4. However, as described above, in the system including the analyzing device as described above, the analyzing device PC 1 is not connected to the internet 4 in many cases from the security point of view. Therefore, in such a configuration, capability of transferring licenses from the installation operator to the device user smoothly under high security is one of the great advantages of the system according to the present invention.

REFERENCE SIGNS LIST

1 . . . Analyzing Device PC
10 . . . Analyzing Device
11 . . . License Authentication Unit
12 . . . Analyzing Device Control and Processing Unit
2 . . . User Terminal 3 . . . Terminal of Installation Operator
4 . . . Internet
5 . . . License Management Server
50 . . . Account Creation Processing Unit
51 . . . License Registration Processing Unit
52 . . . Acceptance Request Reception Processing Unit
53 . . . Acceptance Processing Web Page Creation and Storage Unit
54 . . . E-Mail Notification Unit
55 . . . License Holder Transfer Processing Unit
56 . . . User Account Information Storage Unit
57 . . . License Information Storage Unit
100 . . . Transfer License Selection Screen
101, 113, 131 . . . Software List
102 . . . Checkbox
103 . . . "Transfer" Button
110 . . . Transfer License Confirmation Screen
111 . . . E-Mail Address Entry Field
112 . . . User Information Display Field
114 . . . "Acceptance Request" Button
130 . . . Acceptance Processing Web Page
132 . . . "Accept" Button
133 . . . "Refuse To Accept" Button

The invention claimed is:

1. A software license management server comprising:
at least one memory configured to store computer program code; and
at least one processor configured to execute the computer program code to manage a license of a predetermined software using a first computer and a second computer:
recording information identifying the predetermined software and information identifying a license holder in one-to-one correspondence;
receiving a license transfer request via a computer network from a license holder of the predetermined software on the first computer of an installation operator;
in response to the license transfer request, sending via the computer network to the first computer a transfer license confirmation screen for transferring a license, a display unit of the first computer displaying the transfer license confirmation screen, the transfer licensing confirmation screen including an entry field for entering an e-mail address of a license transfer destination user;
receiving, via the computer network from the first computer, the e-mail address of the license transfer destination user upon a predetermined operation by the installation operator, the e-mail address being entered on the transfer license confirmation screen on the display unit of the first computer;
creating a license acceptance processing web page for the predetermined software upon receiving the predetermined operation;
creating an email to the e-mail address entered on the transfer license confirmation screen, the email including the license acceptance web page, and sending the e-mail via the computer network to the second computer of the license transfer destination user;
receiving via the computer network a license acceptance operation on the license acceptance processing web page browsed via a browser on the second computer of the license transfer destination user; and
updating the license holder of the predetermined software registered in a license information storage unit to the license transfer destination user.

2. The software license management server according to claim 1, wherein the at least one processor is further configured to execute the computer program code to install the predetermined software in a third computer, which is connected to an analyzing device or integrated with the analyzing device for controlling the analyzing device and/or processing data obtained by the analyzing device.

3. The software license management server according to claim 2, wherein the third computer in which the predetermined software is installed is a computer that is not connected to the computer network.

4. The software license management server according to claim 1, wherein
the at least one processor is further configured to execute the computer program code to create and manage a user account for using the server in response to a request from any one of the one or more computers,
when the license holder of the predetermined software submits the license transfer request, the license holder logs in using his or her own user account managed by the at least one processor, and
when the license transfer destination user browses the license acceptance processing web page, the license transfer destination user logs in using his or her own user account managed by the at least one processor.

5. The software license management server according to claim 1, wherein
the predetermined software is composed of a plurality of segment softwares which perform different functions, and
the license transfer request is capable of requesting license transfer by individually specifying the plurality of segment softwares constituting the predetermined software.

6. A software license management method for managing a predetermined software license in a software license management system, the method comprising:
recording information identifying the predetermined software and information identifying a license holder in one-to-one correspondence;
receiving a license transfer request via a computer network from a license holder of the predetermined software on a first computer of an installation operator;
in response to the license transfer request, sending via the computer network to the first computer a transfer license confirmation screen for transferring a license, a display unit of the first computer displaying the transfer license confirmation screen, the transfer licensing confirmation screen including an entry field for entering an e-mail address of a license transfer destination user;
receiving, via the computer network from the first computer, the e-mail address of the license transfer destination user upon a predetermined operation by the installation operator, the e-mail address being entered on the transfer license confirmation screen on the display unit of the first computer;
creating a license acceptance processing web page for the predetermined software upon receiving the predetermined operation;
creating an email to the e-mail address entered on the transfer license confirmation screen, the email including the license acceptance web page, and sending the e-mail via the computer network to a second computer of the license transfer destination user;
receiving via the computer network a license acceptance operation on the license acceptance processing web page browsed via a browser on the second computer of the license transfer destination user; and updating the license holder of the predetermined software registered in a license information storage unit to the license transfer destination user.

7. The software license management method according to claim 6, further comprising installing the predetermined software in a third computer, which is connected to an analyzing device or integrated with the analyzing device for controlling the analyzing device and/or processing data obtained by the analyzing device.

8. The software license management method according to claim 7, wherein the third computer in which the predetermined software is installed is a computer that is not connected to the computer network.

9. The software license management method according to claim 6, wherein when the license holder of the predetermined software submits the license transfer request, the license holder logs in to the license management server using his or her user account created in advance, and when the license transfer destination user browses the license acceptance processing web page, the license transfer destination user logs in to the license management server using his or her own user account created in advance.

10. The software license management method according to claim 6, wherein the predetermined software is composed of a plurality of segment softwares which perform different functions, and the license transfer request is capable of requesting license transfer by individually specifying the plurality of segment softwares constituting the predetermined software.

\* \* \* \* \*